US008545143B2

(12) United States Patent

Liu

(10) Patent No.: US 8,545,143 B2

(45) Date of Patent: Oct. 1, 2013

(54) ROUTER WITH A CUTTING DEPTH ADJUSTMENT MECHANISM

(75) Inventor: Rubao Liu, Nanjing (CN)

(73) Assignee: Chervon Limited, Wanchai (HK)

( * ) Notice: Subject to any disclaimer, the term of this patent is extended or adjusted under 35 U.S.C. 154(b) by 964 days.

(21) Appl. No.: 12/653,311

(22) Filed: Dec. 10, 2009

(65) Prior Publication Data

US 2010/0150679 A1 Jun. 17, 2010

(30) Foreign Application Priority Data

Dec. 11, 2008 (CN) ...................... 2008 2 0214749 U

(51) Int. Cl.

*B23C 1/20* (2006.01)

*B27C 5/10* (2006.01)

(52) U.S. Cl.

USPC ... 409/182; 409/210; 144/136.95; 144/154.5; 144/371

(58) Field of Classification Search

USPC ................. 409/182, 210; 144/136.95, 154.5, 144/371

See application file for complete search history.

(56) References Cited

U.S. PATENT DOCUMENTS

| | | | | | |
|---|---|---|---|---|---|
| 1,584,078 | A * | 5/1926 | Carter | ........................... | 409/182 |
| 4,461,330 | A * | 7/1984 | Judkins | ...................... | 144/154.5 |
| 4,652,191 | A * | 3/1987 | Bernier | ......................... | 409/182 |
| 7,275,900 | B1 | 10/2007 | Phillips et al. | | |
| 7,455,488 | B2 * | 11/2008 | Carlson et al. | ................ | 409/182 |
| 7,552,749 | B2 * | 6/2009 | Kageler et al. | ........... | 144/136.95 |
| 7,900,661 | B2 * | 3/2011 | Thorson et al. | .......... | 144/136.95 |
| 7,931,054 | B2 * | 4/2011 | Pozgay et al. | ........... | 144/136.95 |
| 7,950,882 | B2 * | 5/2011 | Zaiser et al. | .................. | 409/182 |
| 8,021,090 | B1 * | 9/2011 | Kochanowicz | ............... | 409/210 |
| 8,087,437 | B2 * | 1/2012 | Goddard et al. | ......... | 144/136.95 |
| 8,100,613 | B2 * | 1/2012 | Foletti et al. | .................. | 409/186 |
| 2007/0065245 | A1 | 3/2007 | Carlson et al. | | |

* cited by examiner

*Primary Examiner* — Alexander P Taousakis

(74) *Attorney, Agent, or Firm* — McDermott Will & Emery LLP

(57) ABSTRACT

The router of the present invention includes a motor housing for enclosing a motor, a support foot for receiving the motor housing, and an adjustment rod mounted to the support foot. The adjustment rod includes a first engagement part and the motor housing includes a second engagement part matched with the first engagement part. The adjustment rod can move between a first position where the first engagement part engages the second engagement part, and a second position where the first engagement part disengages from the second engagement part. As a result, both a fine and a coarse cutting depth adjustment are performed conveniently and easily.

13 Claims, 7 Drawing Sheets

ROUTER WITH A CUTTING DEPTH ADJUSTMENT MECHANISM

CROSS-REFERENCE TO RELATED APPLICATIONS

This application claims priority under 35 U.S.C. §119 to CN 200820214749.6 filed Dec. 11, 2008, which is hereby incorporated by reference.

FEDERALLY SPONSORED RESEARCH OR DEVELOPMENT

Not Applicable.

TECHNICAL FIELD

The present invention relates to a router, and more particularly to a router with a cutting depth adjustment mechanism.

BACKGROUND OF THE INVENTION

In the prior art, a router with a cutting depth adjustment mechanism is known. The cutting depth is usually adjusted manually by loosening a clamping device located in the support foot of the router. However, this method of cutting depth adjustment is not precise enough to be acceptable. To achieve a precise cutting depth adjustment, Bosch's U.S. Pub. No. 20070065245A1 discloses a precise cutting depth adjustment mechanism that finely adjusts the cutting depth by rotating a motor housing relative to the support foot of the router. This method is not convenient for the operator and the adjustment mechanism disclosed is complicated.

SUMMARY OF THE INVENTION

To overcome the problems explained above, the present invention provides a router with a cutting depth adjustment mechanism that is convenient to operate and has a simple structure.

The present invention provides a router which has a motor housing for enclosing a motor, a support foot for receiving the motor housing, and an adjustment rod pivotally mounted to the support foot. An adjustment button is mounted to the adjustment rod, and part of the adjustment button extends out of the support foot. The adjustment rod includes a first engagement part and the motor housing includes a second engagement part in combination with the first engagement part. The adjustment rod can move between a first position where the first engagement part engages the second engagement part and a second position where the first engagement part disengages from the second engagement part.

An additional improvement of the present invention is that a switching button is mounted to the adjustment rod or the support foot. The switching button may include a cam surface or may be a screw. Further, a sphere is formed in one end of the adjustment rod away from the first engagement part, and a hole sized to receive the sphere is formed in the support foot. Also, one of the first engagement part and the second engagement part is an internal screw thread, and the other is an external screw thread.

As a result of the structure described above, a fine and coarse cutting depth adjustment may be done conveniently and easily.

BRIEF DESCRIPTION OF THE DRAWINGS

To understand the present invention, it will now be described by way of example, with reference to the accompanying drawings in which.

DETAILED DESCRIPTION

Figure 1:
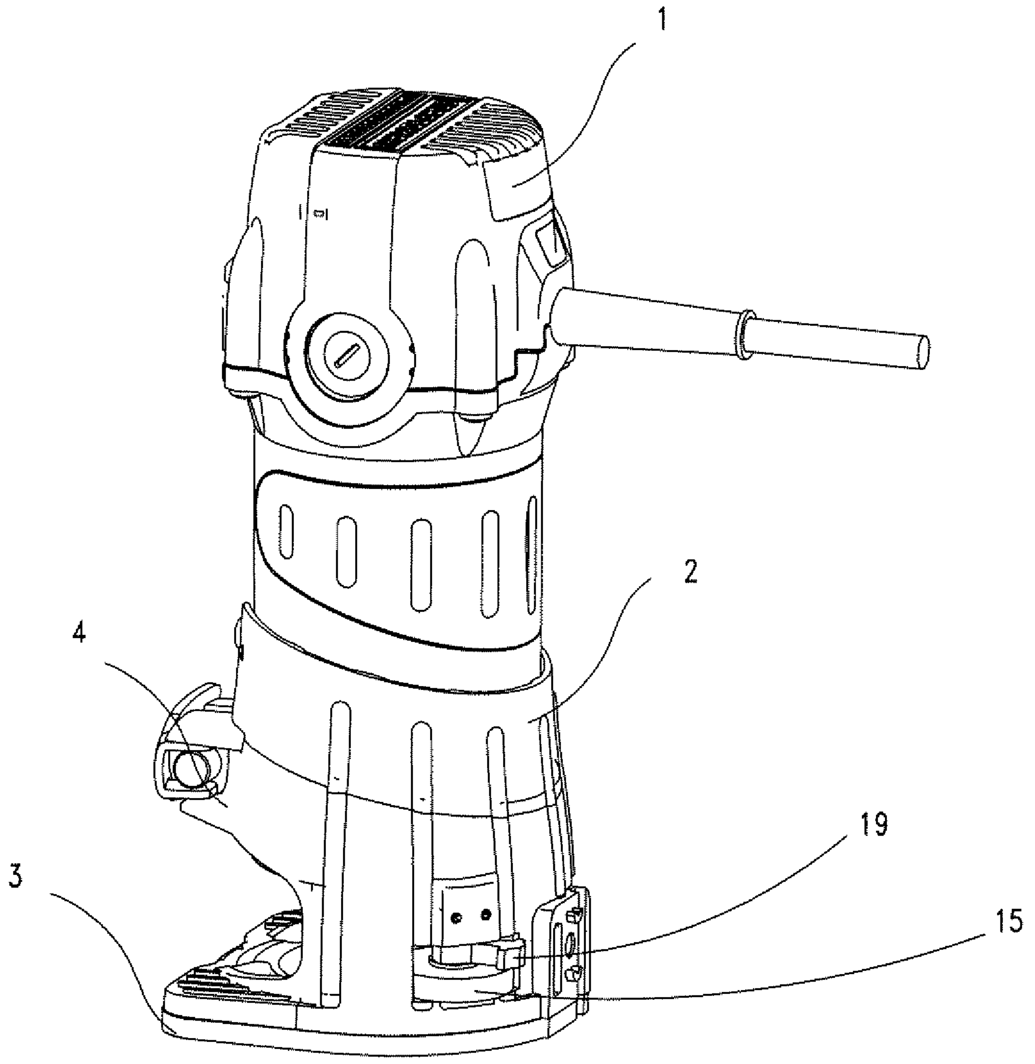
FIG. 1 is a perspective view of a router according to a preferred embodiment of the present invention.
Figure 2:
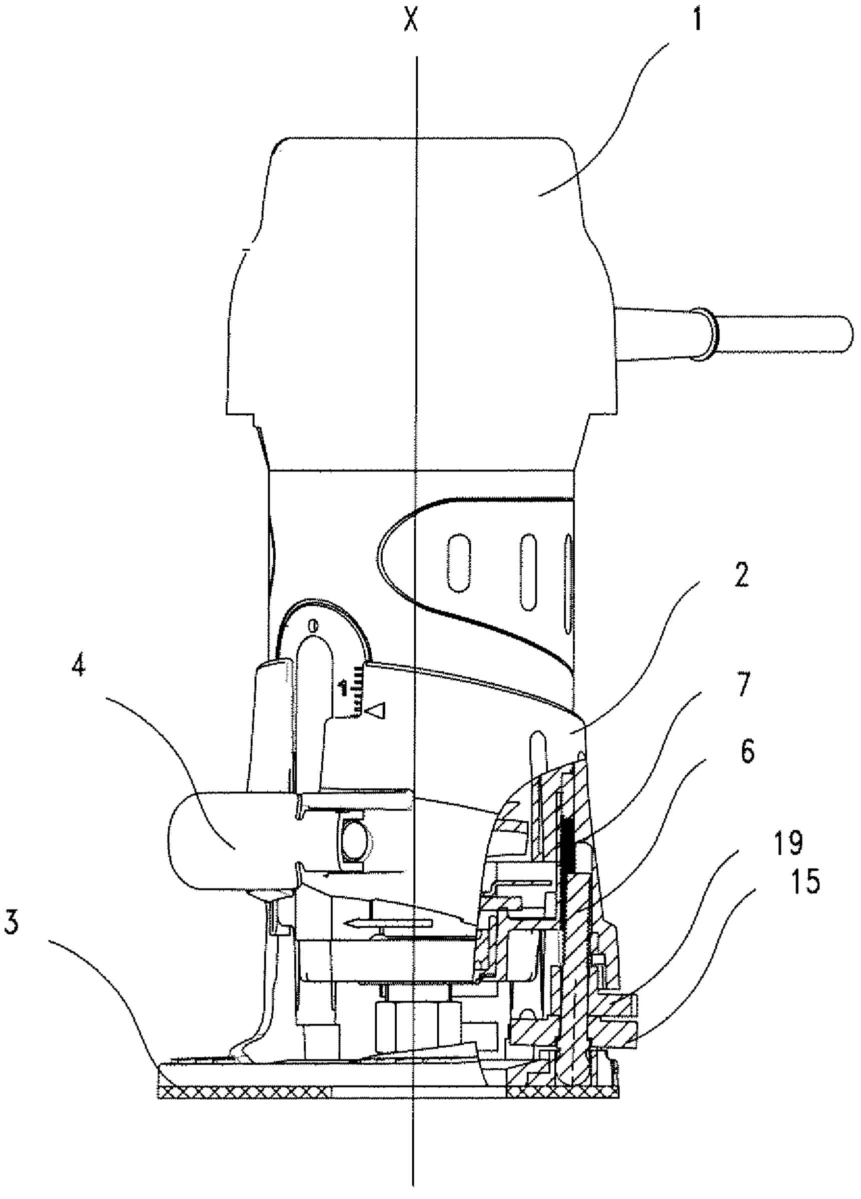
FIG. 2 is a partial cutaway view of a cutting depth adjustment mechanism of the router shown in FIG. 1 being in a coarse adjustment position.

Referring to FIG. 1, a router of a preferred embodiment of the present invention comprises a motor housing 1 for enclosing a motor, a support foot 2 for receiving the motor housing 1 and a foot plate 3 mounted on the underside of the support foot 2. A longitudinal axis X of the motor (shown in FIG. 2) is perpendicular to the foot plate 3. A clamping device 4 mounted on the support foot 2 is used to tighten or loosen the motor housing 1 relative to the support foot 2. Because those skilled in this art are familiar with the clamping device 4, the clamping device 4 will not be described in detail here.

Now referring to FIGS. 2-5, a hole 18 is located in a lower part of the side wall of the support foot 2, and a through-hole 9 is formed in the bottom end of the support foot 2. An adjustment button 15 contains a square hole 14 formed in its center and a stepped surface 13. A switching button 19 contains a through-hole 16 in its center and a cam surface 17. The cam surface 17 engages with or disengages from the inner surface of the support foot 2 by rotating the adjustment button 15. The adjustment button 15 and the switching button 19 are mounted in the support foot 2 along the longitudinal axis X of the motor, and the centerlines of the square hole 14, the through-hole 16 and the through-hole 9 are in alignment. Part of the adjustment button 15 and the switching button 19 project out of the hole 18, so that they are accessible and may be conveniently operated by the operator. An adjustment rod 5 is mounted in the support foot 2, and a first screw thread 6 is formed on an upper part of the adjustment rod 5. A second screw thread 7 that meshes with the first screw thread 6 is formed on an outer surface of the motor housing 1. A sphere 8 and a stepped surface 11 are formed on a lower part of the adjustment rod 5. The adjustment rod 5 extends through the through-hole 9 in the bottom end of the support foot 2, the square hole 14 of the adjustment button 15 and the through-hole 16 of the switching button 19 so that the first screw thread 6 can engage with the second screw thread 7. The stepped surface 11 is in contact with the stepped surface 13 so that the sphere 8 is limited between the stepped surface 13 and the foot plate 3, and the movement of the adjustment rod 5 along its longitudinal direction is also limited. A tight fit is achieved between a part 12 of the adjustment rod 5 which has a square section and the square hole 14 of the adjustment button 15. The switching button 19 can rotate around the adjustment rod 5 relative to the adjustment button 15. The adjustment rod 5 may pivot on the sphere 8 for a certain range. In the present invention, the first screw thread 6 is an external screw thread and the second screw thread 7 is an internal screw thread. In another embodiment, the first screw thread 6 may be an internal screw thread and the second screw thread 7 may be an external screw thread. And in yet another embodiment, the second screw thread 7 is formed on a separate element mounted in the motor housing instead of being formed on the motor housing directly.

Figure 3:
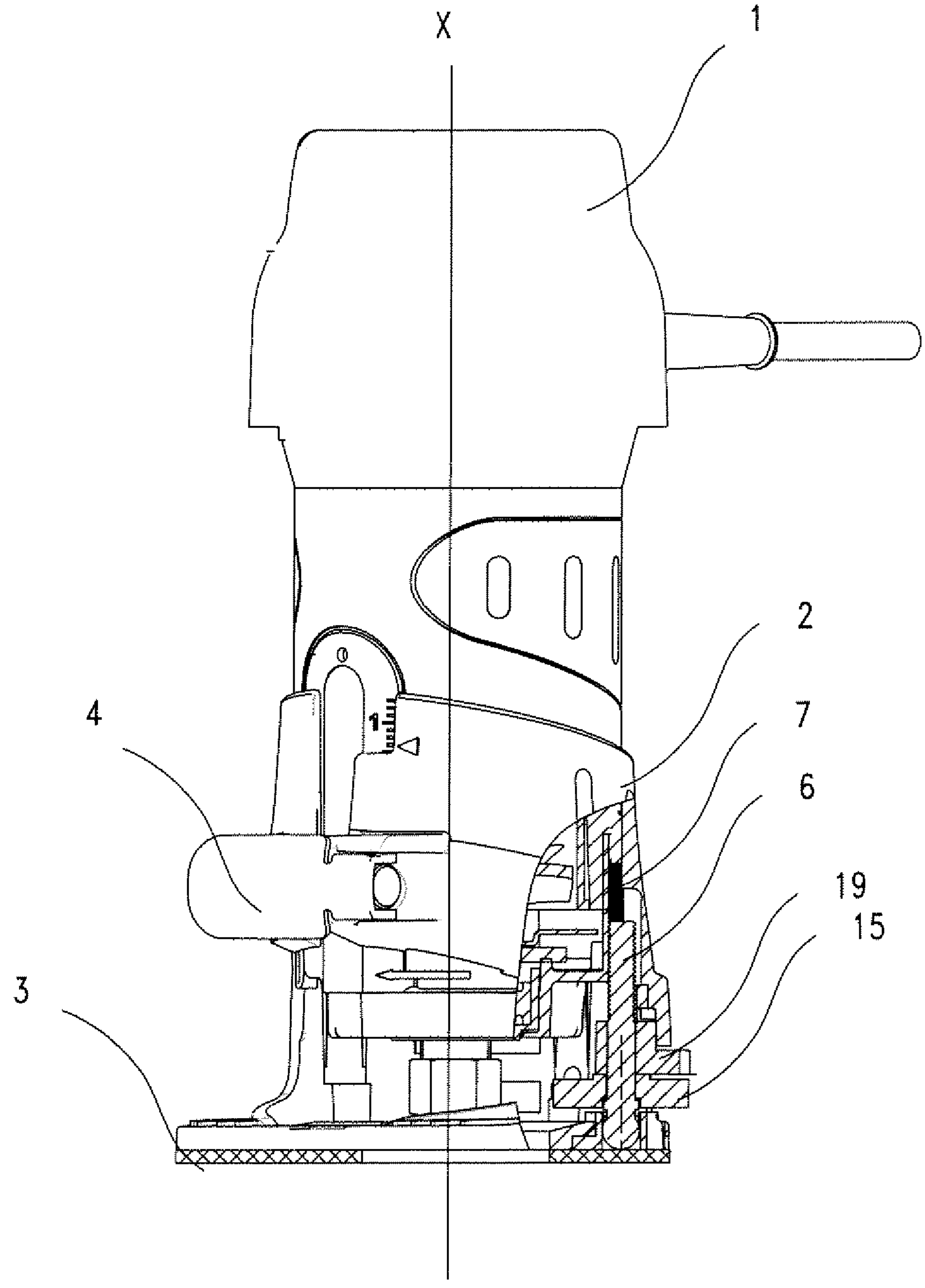
FIG. 3 is a partial cutaway view of the cutting depth adjustment mechanism of the router shown in FIG. 1 being in a fine adjustment position.
Figure 4:
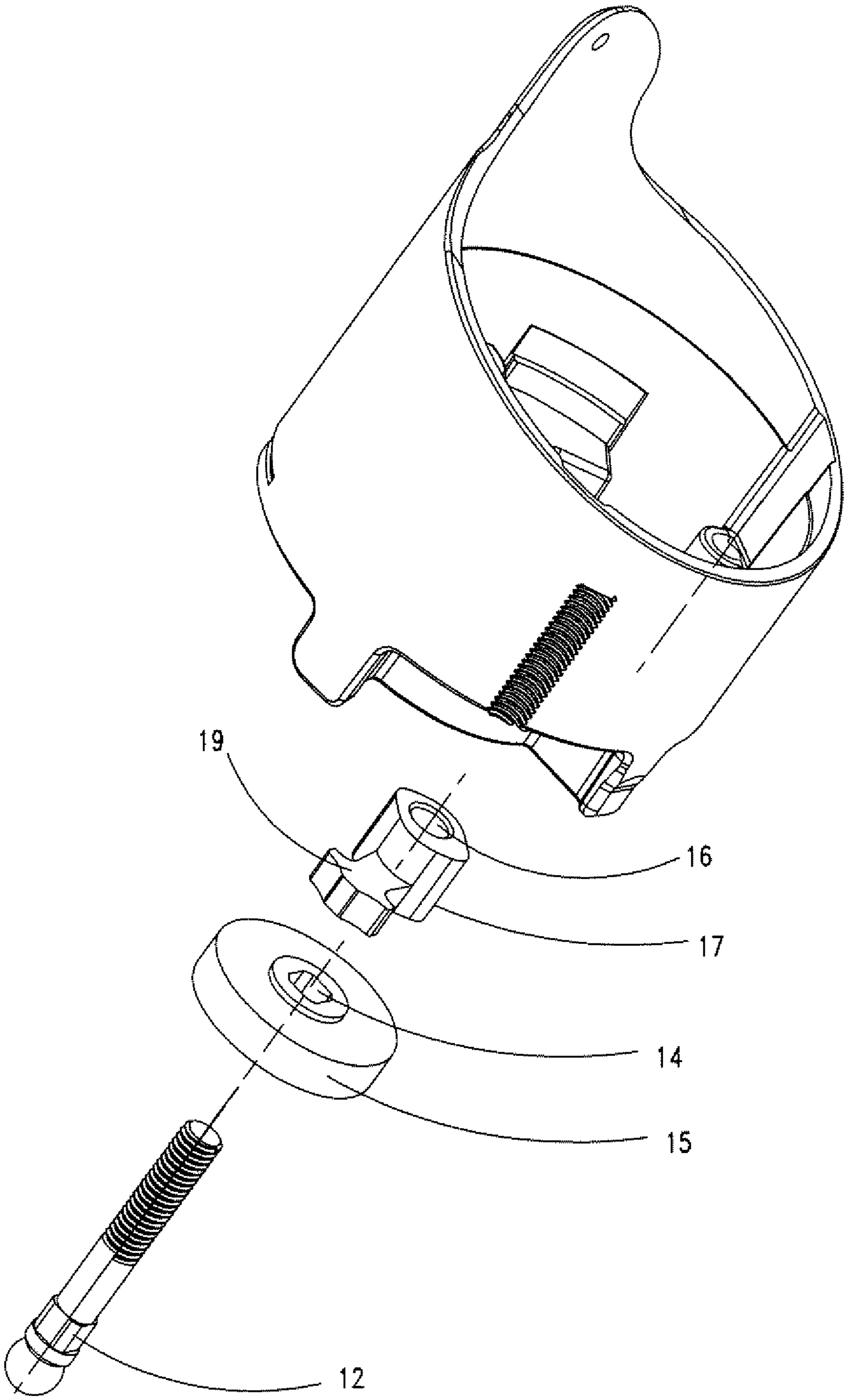
FIG. 4 is an exploded view of the cutting depth adjustment mechanism of the router shown in FIG. 1.
Figure 5:
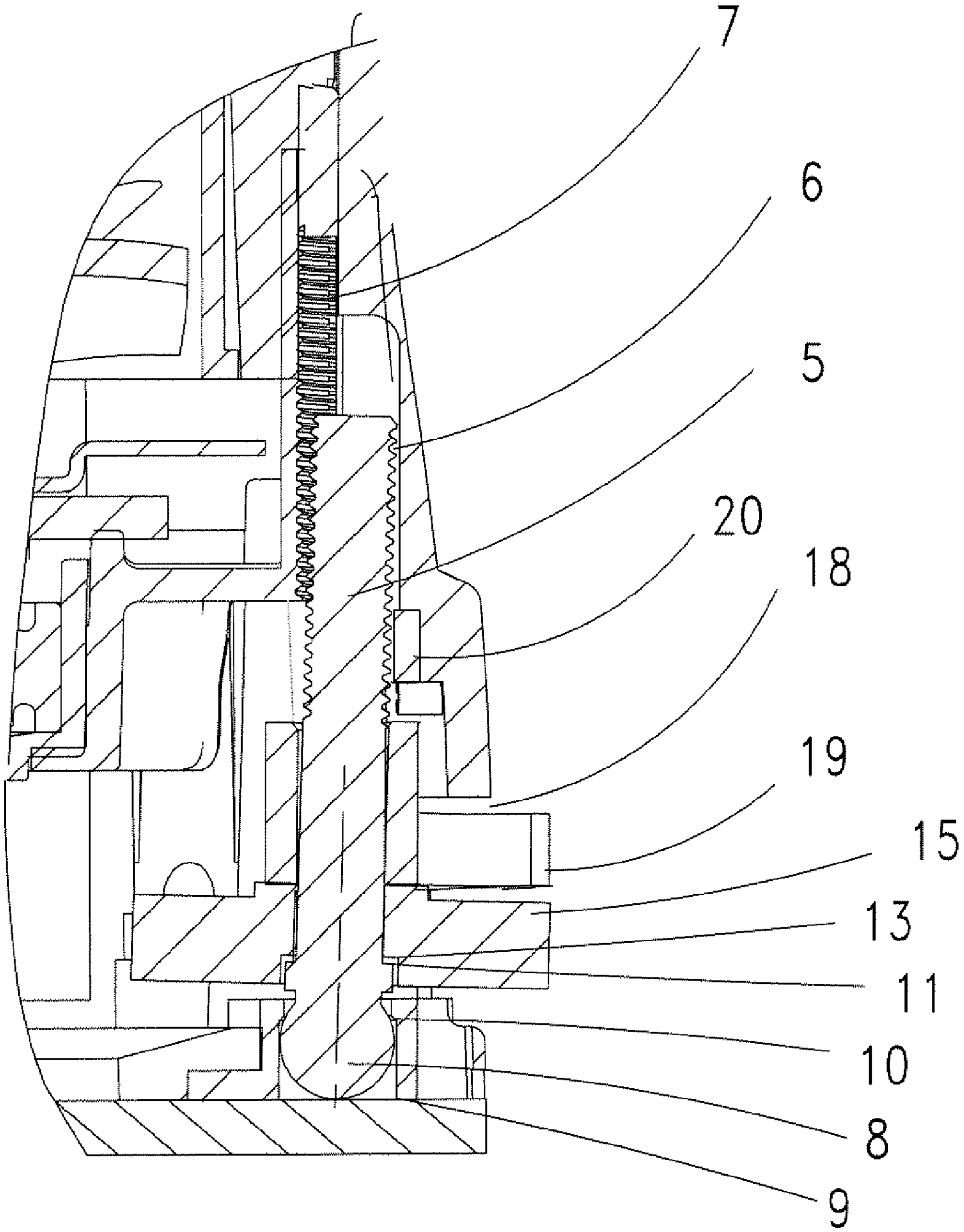
FIG. 5 is an enlarged view of the cutting depth adjustment mechanism of the router shown in FIG. 2.

Referring to FIG. 3, the cutting depth adjustment mechanism of the router is in a fine adjustment position, and the switching button 19 is in a first position where the bigger radius part of the cam surface 17 rests against the inner surface of the support foot 2 and a force is applied to the adjustment rod 5 to make the first screw thread 6 engage the second screw thread 7. To do a fine adjustment of the cutting depth, the clamping device 4 is loosened, and then the adjustment button 15 is used to allow the adjustment rod 5 to rotate. As a result, the motor housing 1 is movable along the longitudinal axis X relative to the support foot 2 by means of the transmission between the first screw thread 6 and the second screw thread 7. The clamping device 4 is then tightened to fix the motor housing 1 on the support foot 2 when a desired cutting depth is adjusted.

The fine adjustment may be done precisely within a small adjustment range. To perform a larger cutting depth adjustment, a coarse adjustment is done first to bring the motor housing to a position around the desired cutting depth, then a fine adjustment is done to set the motor housing exactly in the desired cutting depth. Referring to FIG. 3, to do a coarse adjustment of the cutting depth, the clamping device is loosened, and then the switching button 19 is switched to a second position where the smaller radius part of the cam surface 17 is toward the inner surface of the support foot 2. Then, the adjustment button 15 is pressed downward slightly to allow the adjustment rod 5 to rotate around the sphere 8. In another embodiment, a magnet 20 is mounted on the inner surface of the support foot 2 close to the adjustment rod 5, and the adjustment rod 5 is attracted towards the inner surface of the support foot 2 by the magnet 20 and the adjustment rod 5 rotates around the sphere 8. As a result, the first screw thread 6 formed on an upper part of the adjustment rod 5 disengages from the second screw thread 7 formed on an outer surface of the motor housing 1, and the motor housing 1 can be pulled to a position around the desired cutting depth directly along the longitudinal axis X. After the larger movement is performed, when the switching button 19 is changed to the first position, a fine adjustment, as described above, is performed to set the motor housing to the exact cutting depth position, and the clamping device 4 is then tightened to fix the motor housing relative to the support foot 2.

Figure 6:
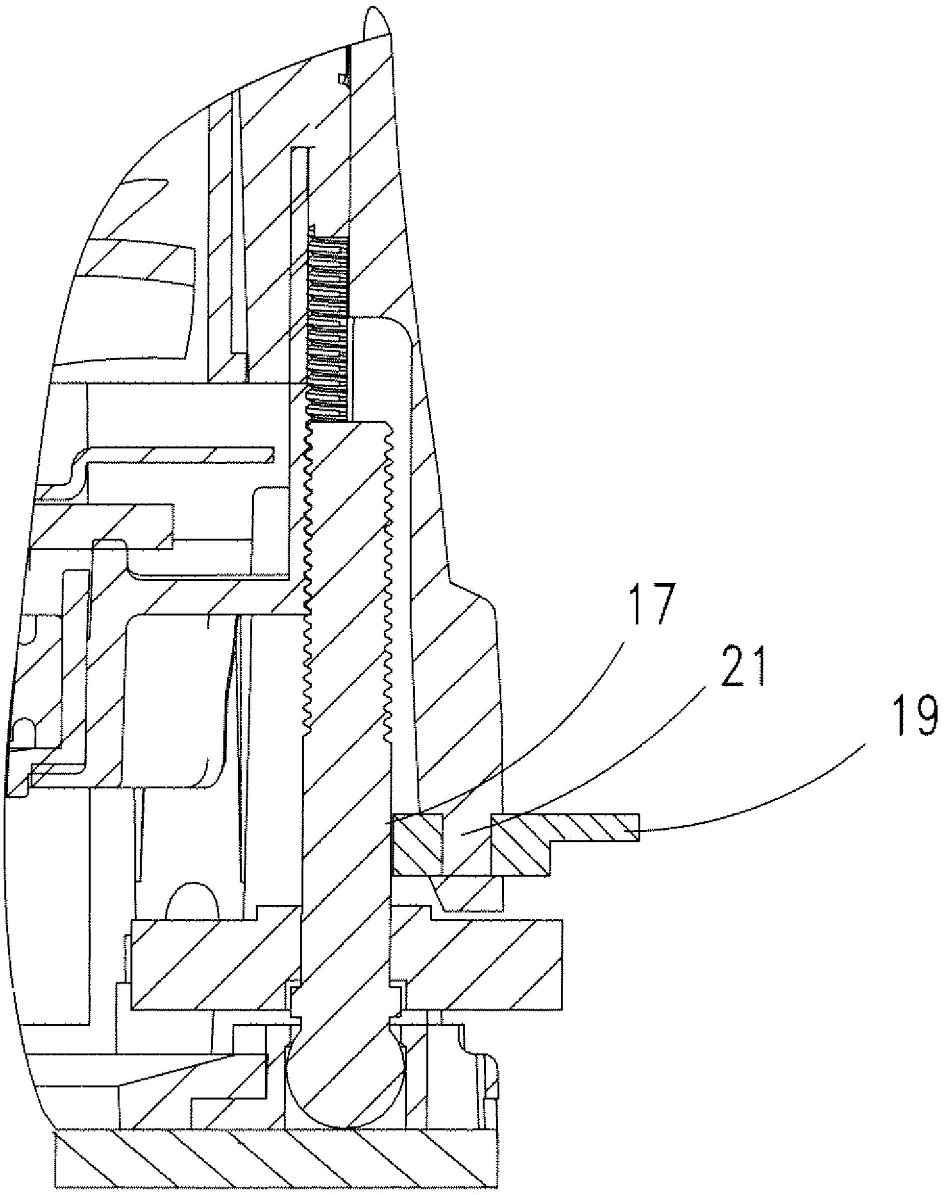
FIG. 6 shows a second embodiment of a switching button of the cutting depth adjustment mechanism of the present invention; and, FIG. 7 shows a third embodiment of a switching button of the cutting depth adjustment mechanism of the present invention.

FIG. 6 shows a second embodiment of the present invention, the switching button 19 is directly mounted to the support foot 2 using a rotating shaft 21. When the switching button 19 is rotated, the cam surface 17 presses against the adjustment rod 5 and the first screw thread 6 formed on an upper part of the adjustment rod 5 engages the second screw thread 7 formed on an outer surface of the motor housing 1. When the switching button 19 is then rotated in an opposite direction, the cam surface 17 disengages from the adjustment rod 5.

Figure 7:
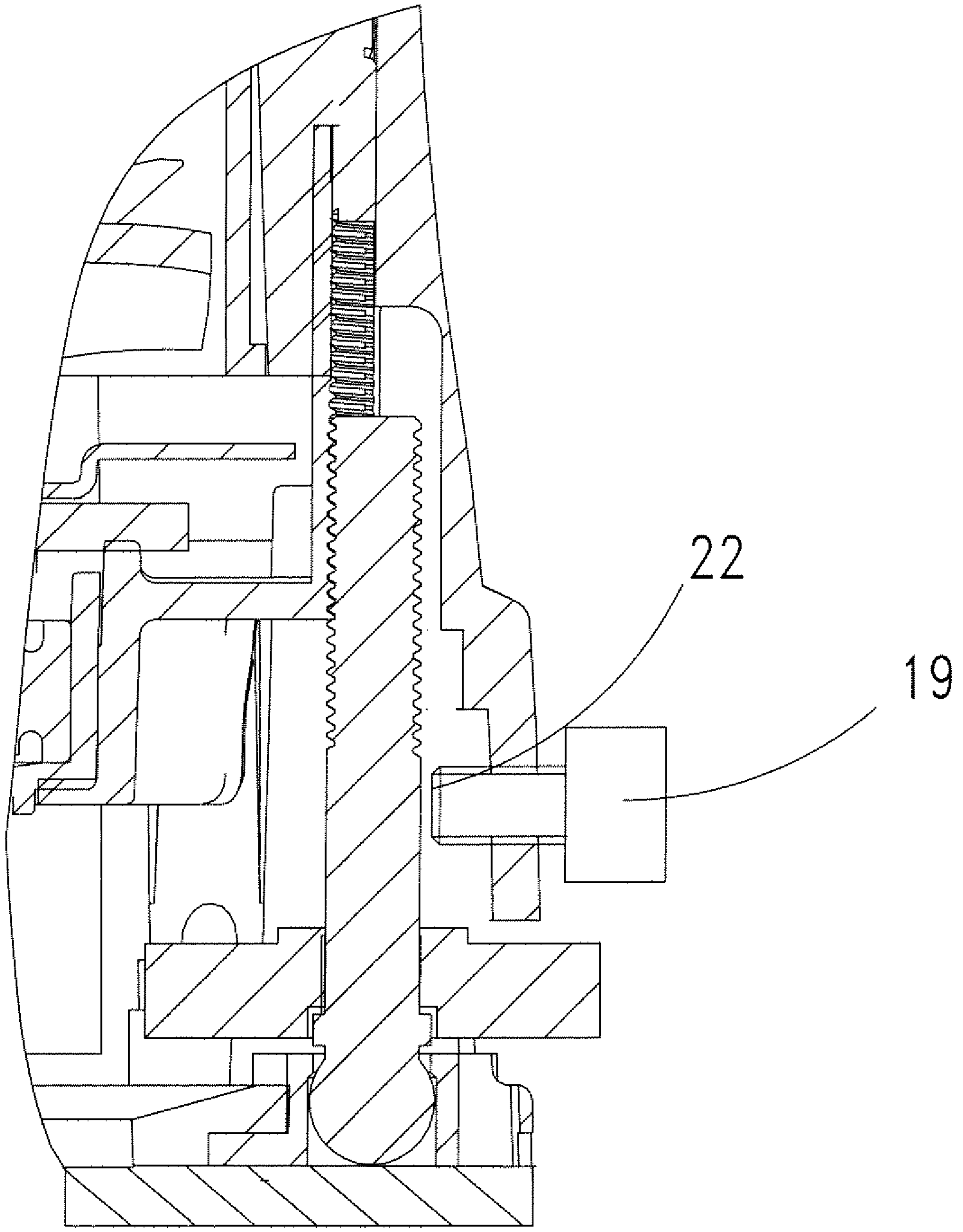

FIG. 7 shows a third embodiment of the present invention, the switching button 19 may be mounted to the support foot 2 using a screw. The switching button 19 may also be a screw rotatably mounted to the support foot 2. Part of the screw is inserted into the support foot 2 and is in contact with the adjustment rod 5. When the screw is rotated, the end face 22 of the screw presses against the adjustment rod 5 and the first screw thread 6 engages the second screw thread 7. When the screw is rotated in an opposite direction, the end face 22 of the screw disengages from the adjustment rod 5.

Persons skilled in the art can easily understand the first screw thread 6 formed in the adjustment rod 5 may be a first tooth part, and the second screw thread 7 formed in the outer surface of the motor housing 1 may be a second tooth part.

The above described preferred embodiments are intended to illuminate the principle of the present invention, but not to limit its scope. It can be easily understood for those skilled in the art that many other modifications and variations of these preferred embodiments will be apparent and may be made without departing from the spirit and the scope of the invention as defined in the following claims.

What is claimed is:

1. A router, comprising:
a motor housing for enclosing a motor;
a support foot for receiving said motor housing;
an adjustment rod pivotally mounted to said support foot at one end thereof;
wherein an adjustment button is mounted to said adjustment rod, and part of said adjustment button extends out of said support foot;
said adjustment rod including a first engagement part;
said motor housing including a second engagement part matched with said first engagement part; and,
a switching button that includes a cam surface is mounted to at least one of the adjustment rod and the support foot.

2. A router as claimed in claim 1, wherein said adjustment rod is able to move between a first position where said first engagement part engages with said second engagement part, and a second position where said first engagement part disengages from said second engagement part.

3. A router as claimed in claim 1, wherein a part of the switching button extends out of the support foot.

4. A router as claimed in claim 1, wherein the switching button is a screw.

5. A router as claimed in claim 1, wherein a sphere is formed in one end of the adjustment rod, and a hole receiving the sphere is formed in the support foot.

6. A router as claimed in claim 1, wherein at least one of the first engagement part and the second engagement part is an internal screw thread, and at least one of the first engagement part and the second engagement part is an external screw thread.

7. A router as claimed in claim 1, wherein a magnet is mounted to said support foot close to said adjustment rod.

8. A router, comprising:
a motor housing for enclosing a motor;
a support foot for receiving said motor housing;
an adjustment rod pivotally mounted to said support foot at one end thereof;
wherein an adjustment button is mounted to said adjustment rod, and part of said adjustment button extends out of said support foot;
said adjustment rod including a first engagement part;
said motor housing including a second engagement part matched with said first engagement part;
a switching button that includes a cam surface is mounted to at least one of the adjustment rod and the support foot;
said adjustment rod being able to move between a first position where said first engagement part engages with said second engagement part, and a second position where said first engagement part disengages from said second engagement part.

9. A router as claimed in claim 8, wherein a part of the switching button extends out of the support foot.

10. A router as claimed in claim 8, wherein the switching button is a screw.

11. A router as claimed in claim 8, wherein a sphere is formed in one end of the adjustment rod, and a hole receiving the sphere is formed in the support foot.

12. A router as claimed in claim 8, wherein at least one of the first engagement part and the second engagement part is an internal screw thread, and at least one of the first engagement part and the second engagement part is an external screw thread.

13. A router as claimed in claim 8, wherein a magnet is mounted to said support foot close to said adjustment rod.

* * * * *